United States Patent [19]

Sinclair et al.

[11] E Re. 31,558

[45] Reissued Apr. 17, 1984

[54] FLAT CATHODE RAY TUBE WITH REPELLER ELECTRODE AND OPTICAL MAGNIFYING MEANS

[76] Inventors: Clive M. Sinclair, 18 Newton Rd., Cambridge, Cambridgeshire; Anthony V. Krause, London Rd., St. Ives, Huntingdon, Cambridgeshire PE17 4HJ, both of England

[21] Appl. No.: 311,155

[22] Filed: Oct. 13, 1981

Related U.S. Patent Documents

Reissue of:

[64] Patent No.: 4,205,252
Issued: May 27, 1980
Appl. No.: 906,062
Filed: May 15, 1978

[30] Foreign Application Priority Data

May 18, 1977 [GB] United Kingdom ..... 20962/77

[51] Int. Cl.[3] ..... H01J 29/72; H01J 29/80; H01J 29/90

[52] U.S. Cl. ..... 313/422; 313/477 R; 313/478

[58] Field of Search ..... 313/422, 474, 477, 478

[56] References Cited

U.S. PATENT DOCUMENTS

| | | | |
|---|---|---|---|
| 2,093,288 | 9/1937 | Ogloblinsky | 313/474 |
| 2,928,014 | 3/1960 | Aiken et al. | 313/422 |
| 3,064,154 | 11/1962 | Law | 313/422 |
| 3,171,056 | 2/1965 | Gabor | 313/422 X |
| 3,275,878 | 9/1966 | Wilbanks | 313/477 X |
| 3,299,314 | 1/1967 | Yamada et al. | 313/422 |
| 3,309,551 | 3/1967 | Aiken | 313/422 |
| 3,435,277 | 3/1969 | Havn et al. | 313/422 |
| 3,890,541 | 6/1975 | McCarthy et al. | 313/422 X |

FOREIGN PATENT DOCUMENTS

| | | | |
|---|---|---|---|
| 1241018 | 7/1971 | United Kingdom | 313/422 |

OTHER PUBLICATIONS

"Die Flache Bildröhre von Hayakawa", Funkschau, 1969, p. 54.

*Primary Examiner*—Palmer C. Demeo
*Attorney, Agent, or Firm*—Laubscher, Philpitt & Laubscher

[57] ABSTRACT

A cathode ray tube is disclosed which is relatively flat in the viewing direction, including a transparent envelope having at least one generally flat section, a screen arranged within the envelope, an electron gun for projecting an electron beam along a path substantially parallel to the plane of the screen, and first and second deflecting means for causing the beam to scan a line and a frame, respectively, characterized by the provision of a single conductive member of a given potential forming a beam directing electrode spaced from the screen and arranged such that the path of the electron beam lies between the electrode and the screen.

13 Claims, 8 Drawing Figures

FLAT CATHODE RAY TUBE WITH REPELLER ELECTRODE AND OPTICAL MAGNIFYING MEANS

Matter enclosed in heavy brackets [ ] appears in the original patent but forms no part of this reissue specification; matter printed in italics indicates the additions made by reissue.

The present invention relates to cathode ray tubes.

SUMMARY OF THE INVENTION

It is an object of this invention to provide a novel and improved cathode ray tube which is relatively flat in the viewing direction.

It is another object of this invention to provide a relatively flat cathode ray tube which is comparatively simple to manufacture.

With these objects in mind, the present invention provides a cathode ray tube comprising an envelope, a screen disposed within the envelope, an electron gun disposed within the envelope and arranged with respect to the screen for projecting an electron beam along a path substantially parallel to the plane of the screen, first deflecting means for causing the electron beam to scan a line, and second deflecting means for causing the electron beam to scan a frame comprising a plurality of lines whereby to produce an image on the screen, the envelope being formed of a plurality of sections, at least a portion of one major surface of one of said sections being planar.

Either said first or second deflecting means may be arranged to deflect the electron beam through an angle less than the angle required to produce on the screen an image of the same dimensions as the desired dimensions of the display whereby to produce an image one dimension of which is less than the desired corresponding dimension of the display, optical means being provided for magnifying the image to produce a display of the desired dimensions.

The screen of the CRT is preferably viewed from the same side as that on which the electron beam forms the image on the screen. The advantages of this arrangement are that less power is required at the screen to form an image of a certain brightness, or for the same power a brighter image can be formed, in which case a screen of as high standard as the screen of a conventional CRT can be formed more simply. The image may be viewed from either side, or from both sides and the screen is accessible for the production of further images, by projection for example. The cathode ray tube to be described is capable of being miniaturized and at present screen sizes in the region of 2 inches are contemplated although other sizes are possible.

BRIEF DESCRIPTION OF THE DRAWINGS

Features and advantages of the present invention will become apparent from the following description of an embodiment thereof given by way of example when taken in conjunction with the accompanying drawings, in which.

DETAILED DESCRIPTION

Figure 1:
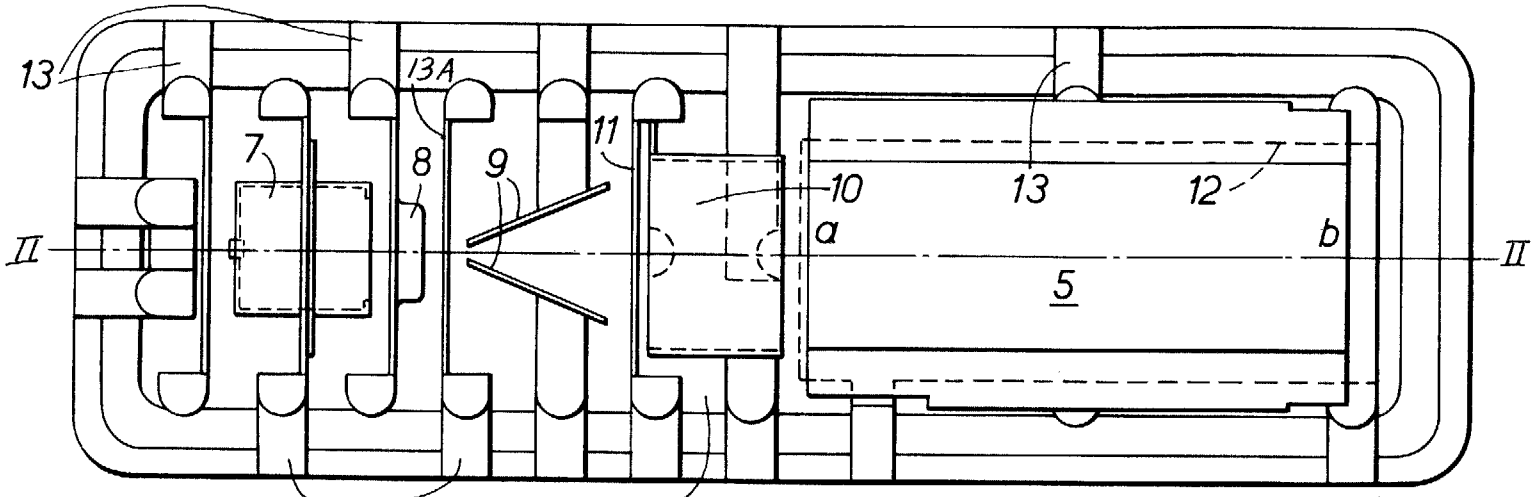
FIG. 1 is a front view of a cathode ray tube.
Figure 2:
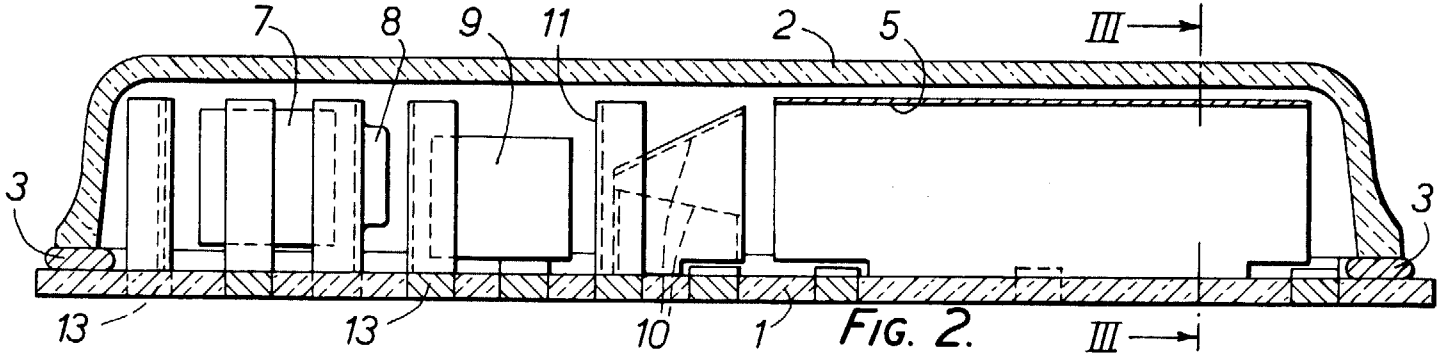
FIG. 2 is a sectional view taken along line II—II of the tube shown in FIG. 1.

The cathode ray tube (CRT) to be described has been designed to have as small overall dimensions as possible and to that end it is proposed that the tube be relatively flat in the viewing direction as compared with conventional tubes. This is primarily achieved by mounting the electron gun of the CRT so that its axis is parallel, or substantially parallel, to the plane of the screen of the CRT. At present, it is preferred to mount the gun so that its axis is parallel to the proposed line direction rather than to the frame scan direction, although the latter position could be used.

Referring now to the drawings, the CRT envelope is generally rectangular in shape and comprises two sections in the form of a dished rear section 2 and a flat-front face plate section 1 which are attached to each other by means of a low temperature frit material 3 around the periphery of the dished section 2. It is possible to dish both sections, in that case, the face plate section 1 would be formed by flat portion surrounded by a raised lip. The preferred design for the face plate section 1 is shown in the drawings i.e. the section 1 is formed from a simple flat piece of optical quality glass whose major surfaces are planar and parallel. However, in some circumstances it is possible for only the minor major surface to be planar and the outer surface to be specially shaped, e.g., curved.

A fluorescent screen 5 is provided within the envelope either as a separate item, as shown, positioned to one side or by being deposited on the interior surface of the section 2.

Also mounted within the envelope are the usual electron gun 7, collimating lens 8, vertical or frame deflecting plates 9, horizontal or line deflecting plates 10, and interplate screen 11. These are disposed along the axis of the gun 7 which is arranged to be parallel to and slightly forward of the plane of the screen.

The envelope, it can be made of any suitable material, e.g., glass, ceramic or metal or combinations thereof, so long as a transparent window is left through which the screen is viewed. At present glass is used for the envelope and the electrical connections to the electron gun and various electrodes within the envelope are made by means of conductive wires or flat tapes which can be separate from or be formed as part of the electrodes and may extend through the glass frit or a wall of the envelope. Alternatively, conductive areas 13 can be formed on the inner surface of one of the envelope sections preferably the flat front section and the electron gun and deflection systems connected thereto. This is particularly convenient since it allows the use of printed circuit techniques. Constructions using low temperature glass frits for bonding the envelope sections together and taking the electrical connections out through the seal are discussed in more detail in our U.K. Patent Specification Nos. 1,353,584 and 1,442,804 and will not be elaborated on here.

The screen 5 of the tube can have a dimension in one direction which is the same as the corresponding dimension of the required picture but the other dimension of the screen is less than the corresponding dimension of the required picture. This is not essential but in certain circumstances it can be useful. It is preferred that the reduced dimension of the screen is at right angles to the axis of the electron gun. When using a screen such as is shown in the drawings in order to produce the required picture it is necessary to magnify the image on the screen in one direction only. Various magnifications have been tried, but a magnification of about 3 would seem to be the upper limit. At present a magnification of 2 is preferred. Since it is intended that the screen be viewed by only one person, a wide angle of view is not required and therefore the magnification powers contemplated can be used without penalty to the viewer.

Figure 3:
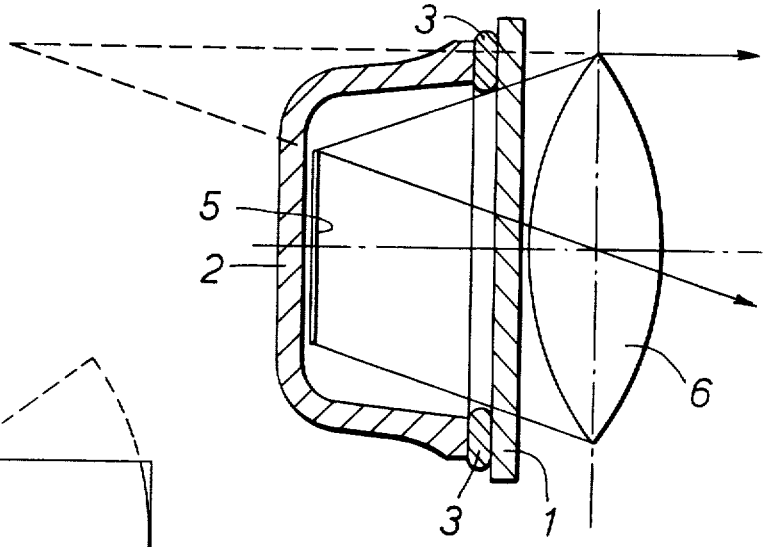
FIG. 3 is a cross-sectional end view taken on line III—III of FIG. 2.

The screen 5 is shown to have a height which is less than the desired picture height while the width of the screen is the same as the desired picture width. In the present case the screen is 40 mm by 15 mm. A lens 6 (FIG. 3) is placed in front of the envelope to magnify the picture height to 30 mm, while keeping the width at 40 mm. Conveniently, this can be a cylindrical lens of a conventional or fresnel type.

The advantage of this arrangement is that because the screen height has been reduced to 15 mm, the deflection required to be produced by the plates 9 is very much less than in the case of a screen with a more conventional height to width ratio.

The benefits to be gained from reduced vertical deflection and subsequent optical magnification will be apparent from a consideration of FIG. 4.

Figure 4A:
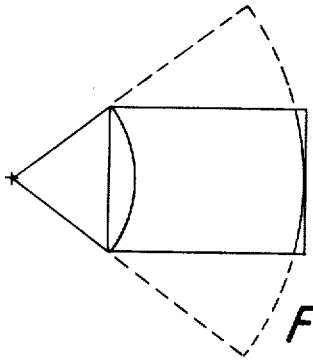
FIG. 4 shows diagrammatically the benefits to be gained by using a cathode ray tube according to FIG. 1.

If one considers a screen 40 mm×30 mm scanned by an electron beam from a frame deflection centre 20 mm, say, from one side of the screen, a conventional arrangement would produce a pattern as shown in FIG. 4a which shows considerable "keystone" distortion indicated by the broken lines. It will be seen that the sides of the display are substantially cured even after "keystone" correction. One method of compensating for this curvature is to correct it electrically by adding a correction waveform to the line scan waveform. This method adds complication to the scanning circuits.

Figure 4B:
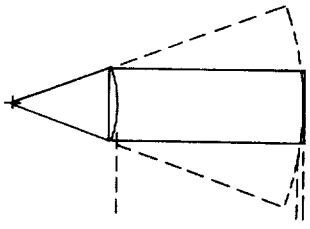

Consider now FIG. 4b which shows a screen 40 mm×15 mm scanned as before. It will be seen that although "keystone" distortion is still present, the effect of the curvature at the sides of the "keystone" is very much reduced due to the reduction in the angle subtended by the scanning electron beam from the top of the screen to the bottom. The full lines indicate that the scan has been corrected to avoid the fan shape of the scan.

Figure 4C:
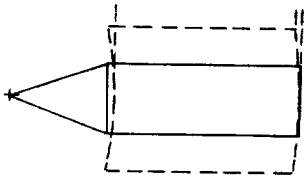

If one now optically magnifies the resultant image on the screen it is clear from FIG. 4c that the apparent curvature of the sides of the display is substantially reduced. In fact, in the present case, the curvature is reduced to such an extent that no further correction need be made, as the resultant display is acceptable to most viewers.

Thus, the vertical deflection required is substantially reduced with consequent power savings. An added advantage is that by using optical magnification, apart from losses in the magnifying lens, for the same beam current and screen voltage the display will be brighter by an amount approximately the same as the power of magnification of the lens.

Figure 5:
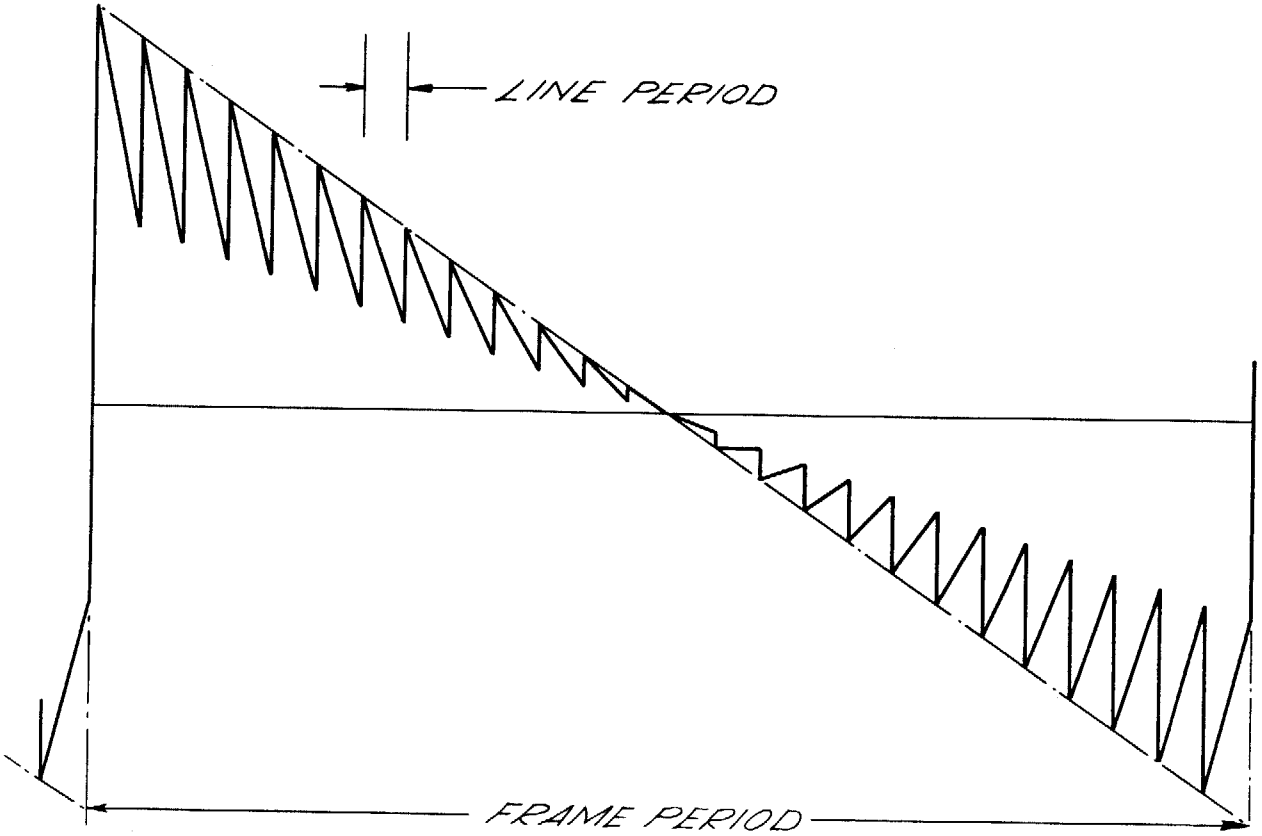
FIG. 5 shows diagrammatically a suitable waveform for the frame scan signal.

The vertical or frame deflection is brought about using the plates 9 and impressing upon them a suitable frame scan signal to correct the raster for "keystone" distortion. The form of a suitable signal is shown in full lines in FIG. 5 with the scan signal to produce an uncorrected raster shown in chain lines. It will be appreciated that the actual scan signal used will have many more line periods than that shown in FIG. 5.

Turning now to horizontal or transverse deflection of the electron beam into the plane of the screen, it will be recalled that the axis of the gun 7 is parallel to and displaced from the plane of the screen therefore the deflector plates 10 are used to deflect the electron beam on the screen to produce the line scan. However, as the electron beam is moved over the screen 5 by the action of the plates 10 to produce the line scan, a circular spot at the edge of the screen marked "a" in FIG. 1 will have become elliptical by the time the beam reaches the edge "b" due to the increase in the angle of incidence of the beam at the screen. This is in spite of the fact that deflection of an electron beam must result in convergence. To overcome this problem, additional deflecting means is provided. This deflecting means takes the form of an additional electrode or electrodes parallel to the screen and extending from a line corresponding to the edge "b" of the screen towards the electron gun. This additional electrode or electrodes will be called the repeller. In the present embodiment the repeller comprises a single transparent conductive coating 12 on the flat section 1 of the envelope although in some circumstances a plurality of conductive coatings at different potentials might be used.

At the edge of the screen marked "a" the spot spread has been reduced by the action principally of the deflector plates 10, which bend the electron beam thus causing it to converge and be self-focusing to an extent. This is termed "deflection focusing" and is well known in the operation of electrostatically deflected cathode ray tubes. This self-focusing effect lessens as the deflection is decreased due to the increase in the angle of incidence of the beam on the screen towards the further edge. Turning now to the further edge "b" of the screen, a transverse field has been provided between repeller and screen to produce a sharply focused spot in the longitudinal direction by producing an additional bend towards the screen in the beam produced by the plates 10. There is now a condition where the spot is sharply focused at each extreme edge of the display by two different effects that lessen towards the centre of the display area.

It has been found that this electron beam system is analogous to a system of crossed cylindrical lenses following a collimating lens 8 which can be considered as a spherical lens.

This comes about because the frame deflecting plates 9 form an effective cylindrical lens with respect to the third anode 13A and the interplate screen 11 and this equivalent lens is able to produce a focus in the frame direction. Following the interplate screen 11 the line deflector plates 10 form a cylindrical lens which is able to produce a focus in the line direction.

At the exit of plates 10 there is, in principle, the effect of two crossed cylindrical lenses, one of which converges the electron beam in a plane parallel to the screen which results in a degree of collimation of the scanned raster, and the other of which contributes to convergence of the electron beam in a plane along the axis of the electron gun and normal to the plane of the screen 5.

Finally, the transverse field of the PDA system may be visualized at any point as a converging lens operating in a plane along the axis of the electron gun and normal to the plane of the screen 5. In traversing the spot from edge "a" to edge "b" of the screen 5 through the transverse field, it has been found that a small change in lens 8 potential is capable of maintaining focus, but as expected from the axially varying nature of the transverse field, a change also may be necessary in the mean potential applied to the plates 10 in order to maintain focus. Variation of the strength of the transverse field with axial distance is compensated for, in maintaining focus, by appropriate variation in the strengths of the lens effects described.

Figure 6:
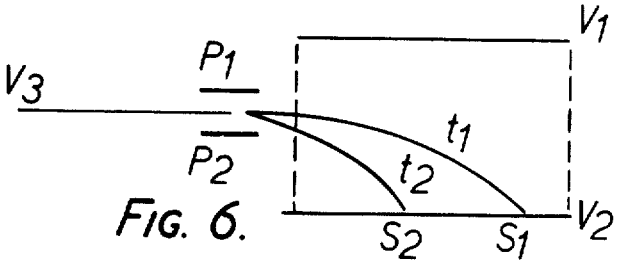
FIG. 6 is a diagram for assisting and understanding of the operation of the cathode ray tube shown in FIG. 1.

A significant advantage of the construction and operational principles proposed in the facility with which the kind of operation known as 'post deflection acceleration' (p.d.a.) can be achieved. In p.d.a., as is well known, where a higher screen potential than deflector potential is used in order to conserve deflection voltages, a lens effect is introduced that tends to offset the gain to be expected. This is partly due to the field itself and partly due to the penetration of this field into the space between the adjacent deflector plates (10 in the specification). Precautions to minimize these lens effects, i.e. to weaken them, result in greatly increased CRT length or increased complexity and difficulty in manufacture. In our case no precautions are needed to minimize the lens effects, as the field itself is a part of the system, while its penetration into the deflection region is inherently minimal. Referring to FIG. 6, the deflection plates $P_1$ and $P_2$ have a deflection voltage between them Vp that results in the two electron beam trajectories $t_1$ and $t_2$ arriving at the screen at positions $S_1$ and $S_2$. The deflector potential is $V_3$ and the field between 'screen' at $V_2$ and a repeller at $V_1$ results in the curved trajectories. This field is the transverse field. In the absence of the transverse field the deflection sensitivity will be infinitely high, because spot position $S_1$ will be at infinity, but the deflection law is non-linear, following the relationship $ds/dVp = -K/Vp^2$ where Vp is the voltage between deflecting plates. One of the objectives for the transverse field is to reduce this non-linearity so that ds/dVp approaches a constant value as in the case of a conventional CRT. When this is done it is found that the constant value of sensitivity, with convenient values of potential and dimension, are of the same order as that of a conventional CRT in the absence of post deflection acceleration. The deflection linearity correction introduced by the transverse field $V_1$–$V_2$ is reducing the fundamentally high deflection sensitivity, but only to a value that wo uld be normally experienced in a conventional CRT in the absence of p.d.a.

Turning now to the question of the penetration of the p.d.a. field into the space between the deflectors $P_1$ and $P_2$, this will result in a lens effect that will reduce sensitivity and decrease linearity. It is convenient however to operate $V_1$ at a value less than $V_3$, and $V_2$ at a value greater than $V_3$. Therefore, there will be a region between $V_1$ and $V_2$ at a potential equal to $V_3$. It is convenient to place the deflectors in this region, and then the axial change in potential is zero.

The above features allow a CRT to be constructed having an apparent picture size of about 2 inches and yet the envelope only has a volume of about 50 cc which is almost one third of the volume of a conventional CRT of similar resultant screen size. The improved CRT can be manufactured inexpensively using mainly known techniques and in operation uses much less power than a conventional CRT of equivalent performance. In order to further reduce the power consumption of the CRT, a low power cathode heater is preferably incorporated (as in the above patents).

Various alterations can be made to the structure of the CRT as described. For example, the repeller need not be a transparent coating. It could be a fine wire mesh invisible to the naked eye, even when magnified by the lens in front of the screen.

Further, the screen need not be strictly parallel to the axis of the electron gun. A parallel arrangement is most economic in volume. Any degree of 'tilt' can be accommodated as this requirement is lessened, until we approach the conventional disposition. As this is approached, however, the described advantages of the transverse field operation are lessened, being at a maximum when the screen is parallel to the axis of the electron gun. At angles above 30° the advantages of the transverse field action are small, but could be utilised nevertheless as a means of correcting focus and deflection non-linearities.

What we claim is:

1. A cathode ray tube, comprising (a) an evacuated envelope including a plurality of sections (1,2) at least one of which (1) is planar and formed of a transparent material;

(b) a generally planar fluorescent screen (5) arranged in said envelope opposite, parallel with and spaced from said one transparent envelope section;

(c) an electron gun (7) arranged within said envelope in laterally spaced relation to said screen for projecting an electron beam between said screen and said one transparent envelope section along a path generally parallel with the plane of said screen;

(d) first deflecting means (10) arranged in said envelope for causing the electron beam to scan a line;

(e) second deflecting means (9) arranged in said envelope for causing the electron beam to scan a frame including a plurality of lines, thereby to produce an image on the screen; [and]

(f) beam directing means compensating for the increase of the angle of incidence of the beam at the screen relative to the direction of the electron beam, said beam directing means comprising a single electrically conductive repeller electrode (12) mounted in said envelope opposite said screen;

(g) *one of said first and second deflecting means being arranged to deflect the electron beam through an angle less than the angle required to produce on the screen an image of the same dimensions as the desired dimensions of the display, thereby to produce an image one dimension of which is less than the desired corresponding dimension of the display;*

(h) *and further including optical means (6) for magnifying the image to produce a display of the desired dimensions.*

2. Apparatus as defined in claim 1, wherein said repeller electrode comprises a wire mesh.

3. Apparatus as defined in claim 1, wherein said repeller electrode comprises a transparent coating on the surface of said one envelope section.

4. Apparatus as defined in claim 1, wherein said first deflecting means comprises a pair of plates arranged on opposite sides of said electron beam, said plates being arranged to diverge outwardly from each other in the direction of the electon beam.

5. Apparatus as defined in claim 1, wherein the said one transparent section is the face plate of the envelope.

6. Apparatus as defined in claim 1, wherein the major surface of said one section is planar over its entire area.

7. Apparatus as defined in claim 1, wherein said one transparent section includes conductive areas (13) to which said electron gun and said first and second deflecting means are connected.

8. Apparatus as defined in claim 1, wherein the envelope sections are formed of glass and are joined together by a glass frit.

9. Apparatus as defined in claim 7, wherein the envelope sections are formed of glass and are joined together by a glass frit, and further wherein the conductive areas are provided with electrical conductors which extend through the glass frit whereby external electrical connections may be made.

10. Apparatus as defined in claim 1, wherein both envelope sections are generally rectangular, said one envelope section being flat and the other section being dished.

[11. Apparatus as defined in claim 1, wherein one of said first and second deflecting means is arranged to deflect the electron beam through an angle less than the angle required to produce on the screen an image of the same dimensions as the desired dimensions of the display thereby to produce an image one dimension of which is less than the desired corresponding dimension of the display, and further including optical means (6) for magnifying the image to produce a display of the desired dimensions.]

12. Apparatus as defined in claim [11] *1*, wherein said second deflecting means is arranged to deflect the electron beam through said angle which is less than the angle required to produce an image of the same dimensions as the desired dimensions of the display.

13. Apparatus as defined in claim 2, wherein said second deflecting means is arranged to deflect the electron beam through an angle which is at least one third of the angle required to produce an image of the same dimensions as the desired dimensions of the display, and said optical means is arranged to magnify the image by up to 3 times.

14. Apparatus as defined in claim 12, wherein said second deflecting means deflects the electron beam through an angle which is one half the angle required to produce an image of the same dimensions as the desired dimensions of the display, and said optical means magnifies the image by a factor of 2.

* * * * *

UNITED STATES PATENT AND TRADEMARK OFFICE

CERTIFICATE OF CORRECTION

PATENT NO. : RE 31,558

DATED : April 17, 1984

INVENTOR(S) : Sinclair, Clive M. et al

It is certified that error appears in the above-identified patent and that said Letters Patent is hereby corrected as shown below:

In the heading, please insert:

-- Assignee: National Research Development Corporation, London, England --

Signed and Sealed this

*Fourth* Day of *December 1984*

[SEAL]

*Attest:*

GERALD J. MOSSINGHOFF

*Attesting Officer*

*Commissioner of Patents and Trademarks*